United States Patent
Cho (10) Patent No.: US 12,340,199 B2
(45) Date of Patent: Jun. 24, 2025

(54) TOUCH SYSTEM AND METHOD FOR UPDATING FIRMWARE

(71) Applicant: SILICON WORKS CO., LTD., Daejeon (KR)

(72) Inventor: Jae Hyun Cho, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 249 days.

(21) Appl. No.: 17/115,374

(22) Filed: Dec. 8, 2020

(65) Prior Publication Data

US 2021/0191709 A1  Jun. 24, 2021

(30) Foreign Application Priority Data

Dec. 20, 2019 (KR) .................. 10-2019-0171570

(51) Int. Cl.
| | |
|---|---|
| *G06F 8/65* | (2018.01) |
| *G06F 3/041* | (2006.01) |
| *G06F 8/61* | (2018.01) |
| *G06F 8/654* | (2018.01) |

(52) U.S. Cl.
CPC .............. *G06F 8/65* (2013.01); *G06F 3/0412* (2013.01); *G06F 3/04164* (2019.05); *G06F 8/61* (2013.01); *G06F 8/654* (2018.02)

(58) Field of Classification Search
CPC . G06F 8/65; G06F 8/654; G06F 8/658; G06F 8/66; G06F 8/61; G06F 3/0412; G06F 3/04164

See application file for complete search history.

(56) References Cited

U.S. PATENT DOCUMENTS

| | | | | |
|---|---|---|---|---|
| 7,069,452 | B1* | 6/2006 | Hind .................... | G06F 21/572 713/1 |
| 7,089,547 | B2* | 8/2006 | Goodman ................ | G06F 8/65 717/169 |
| 8,429,643 | B2* | 4/2013 | Venkatachalam ....... | G06F 21/72 717/173 |
| 9,547,381 | B2 | 1/2017 | Choi et al. | |
| 10,430,181 | B1* | 10/2019 | Su .......................... | G06F 8/654 |
| 10,996,789 | B1* | 5/2021 | Lin ......................... | G06F 8/65 |
| 2002/0138225 | A1* | 9/2002 | Wong .................... | G06F 9/4405 702/119 |

(Continued)

FOREIGN PATENT DOCUMENTS

| | | |
|---|---|---|
| JP | 4172500 B2 | 10/2008 |
| KR | 10-2015-0002178 A | 1/2015 |

(Continued)

OTHER PUBLICATIONS

Lin, Taiwan Patent Application No. 108140347 (Nov. 7, 2019) (Year: 2019).*

*Primary Examiner* — Lewis A Bullock, Jr.
*Assistant Examiner* — Theodore E Hebert
(74) *Attorney, Agent, or Firm* — ROTHWELL, FIGG, ERNST & MANBECK, P.C.

(57) ABSTRACT

The present disclosure relates to a touch system and a method for updating firmware and, more specifically, relates to a touch system and a method for eliminating errors that may occur when updating firmware by storing header data of update-data of the firmware and verifying the validity thereof after storing body data thereof and verifying the validity thereof.

10 Claims, 6 Drawing Sheets

(56) References Cited

U.S. PATENT DOCUMENTS

| | | | | |
|---|---|---|---|---|
| 2003/0167373 | A1* | 9/2003 | Winters | G06F 8/654 |
| | | | | 711/104 |
| 2005/0216753 | A1* | 9/2005 | Dailey | G06F 8/654 |
| | | | | 713/191 |
| 2007/0220504 | A1* | 9/2007 | Eker | G06F 8/654 |
| | | | | 717/168 |
| 2009/0064125 | A1* | 3/2009 | Venkatachalam | G06F 8/65 |
| | | | | 717/170 |
| 2015/0012688 | A1* | 1/2015 | Zhang | G06F 12/0246 |
| | | | | 711/173 |
| 2015/0168934 | A1* | 6/2015 | Pai | G05B 19/0421 |
| | | | | 700/20 |
| 2016/0070477 | A1* | 3/2016 | Sugino | G06F 8/654 |
| | | | | 711/103 |
| 2017/0010881 | A1* | 1/2017 | Kawazu | G06F 8/654 |
| 2018/0052600 | A1* | 2/2018 | Kim | G06F 9/4406 |
| 2021/0072843 | A1* | 3/2021 | Komatsu | G06F 3/04186 |
| 2021/0191560 | A1* | 6/2021 | Ahn | G06F 9/441 |
| 2021/0191709 | A1* | 6/2021 | Cho | G06F 3/04164 |

FOREIGN PATENT DOCUMENTS

| | | |
|---|---|---|
| KR | 10-2017-0126230 A | 11/2017 |
| KR | 10-2018-0020498 A | 2/2018 |

\* cited by examiner

TOUCH SYSTEM AND METHOD FOR UPDATING FIRMWARE

CROSS REFERENCE TO RELATED APPLICATION

This application claims priority from Republic of Korea Patent Application No. 10-2019-0171570, filed on Dec. 20, 2019, which is hereby incorporated by reference in its entirety.

BACKGROUND

1. Field of Technology

The embodiment relates to a touch system and a method for updating firmware.

2. Description of the Prior Art

In general, various embedded systems such as digital cameras, smart phones, and the like, especially digital devices including touch functions, have a system operating program, which is called firmware, provided in a controller (e.g., a central processing unit (CPU)) and a memory unit.

These devices allow firmware to be updated from outside the device in order to expand a touch function and to troubleshoot problems.

In addition, the updating of the firmware by general users in digital devices has the advantage of reducing maintenance costs of manufacturers by allowing the users to solve the problems of the devices themselves.

However, since firmware is a program that directly affects system operation, the updating process thereof requires considerable care, and incomplete updating due to mistakes or accidents may cause a serious problem with malfunction of the device.

SUMMARY

An objective of the embodiment, in one aspect, is to provide a technique for eliminating errors that occur in firmware when updating the firmware.

In order to attain the above objective, an embodiment provides a touch system including: a processor; a first memory configured to store a first firmware and a second firmware for driving the processor in different storage areas; and a second memory to which the first firmware is uploaded by the processor, wherein the first firmware is configured to receive update-data for the first firmware from a host after being executed by the processor in the state of being uploaded to the second memory, store body data of the update-data in the first memory, and then store header data of the update-data in a blank section provided at the front of a memory section in which the body data is stored in the first memory.

The touch system may further include a touch driving circuit configured to supply a driving signal to a sensor electrode of the touch panel provided in an electronic device and receive a response signal to the driving signal from the sensor electrode, thereby generating touch data, and the first firmware executed by the processor may calculate touch coordinates on the touch panel on the basis of the touch data, and may provide the touch coordinates to the host.

The first firmware may verify validity of the body data after storing the body data in the first memory and, if the validity of the body data is proved, may store the header data in the first memory.

The first firmware may verify validity of the header data after storing the header data in the first memory and, if the validity of the header data is proved, may complete updating of the first firmware.

The first firmware may divide the body data into a plurality of data blocks, may sequentially store the same in the first memory, may verify the validity of one data block whenever one data block is stored in the first memory, and if the validity is proved for all of the plurality of data blocks, may store the header data in the first memory.

The touch system may further include a communication interface including a first communication interface configured to provide a communication path between the processor and the first memory, and a second communication interface configured to provide a communication path between the processor and the host.

The first firmware may temporarily store the update-data in the second memory, may configure a first address to an $N^{th}$ address (N is a natural number), which belong to a range of addresses for a memory section storing the header data in the first memory, as a blank section, and may then store the body data in an $(N+1)^{th}$ address of the first memory and in addresses subsequent thereto.

The second firmware may be uploaded to the second memory, and may be executed by the processor when an error occurs in the first firmware.

The second firmware may receive the update-data of the first firmware from the host, and may store the header data of the update-data in the first memory after storing the body data of the update-data in the first memory such that the header data is stored in a blank section provided at the front of the memory section in which the body data is stored.

A blank area corresponding to a predetermined memory section may be provided between the storage area of the first firmware and the storage area of the second firmware in the first memory.

In another embodiment, a method for updating firmware in a touch system provided in an electronic device may include: a data reception step of receiving update-data for the firmware from a host of the electronic device; a data temporary-storage step of temporarily storing the update-data in a second memory of the electronic device; a body data storage step of storing body data of the update-data in a first memory of the electronic device and verifying the validity of the body data; and a header data storage step of storing header data of the update-data in the first memory if the validity of the body data is proved.

In the header data storage step, the touch system may store the header data in a blank section provided at the front of the section in which the body data is stored in the first memory.

The body data storage step may include the steps of: dividing the body data temporarily stored in the second memory into a plurality of data blocks; sequentially storing the plurality of data blocks in the first memory while verifying validity of one data block whenever one data block is stored in the first memory; and verifying the validity for all of the plurality of data blocks.

The touch system may include: a touch driving circuit configured to supply a driving signal to a sensor electrode of a touch panel provided in the electronic device and receive a response signal to the driving signal from the sensor electrode, thereby generating touch data; and a touch device configured to receive the touch data from the touch driving circuit through the execution of the firmware and calculate touch coordinates on the touch panel on the basis of the touch data.

In the body data storage step, the validity of body data is verified using one or more of parity checking, cyclically redundancy checking (CRC), and checksum.

As described above, according to the embodiment, it is possible to normally complete updating of firmware by storing header data of update-data and verifying the validity thereof after storing body data thereof and verifying validity thereof in order to eliminate errors that may occur when updating firmware.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
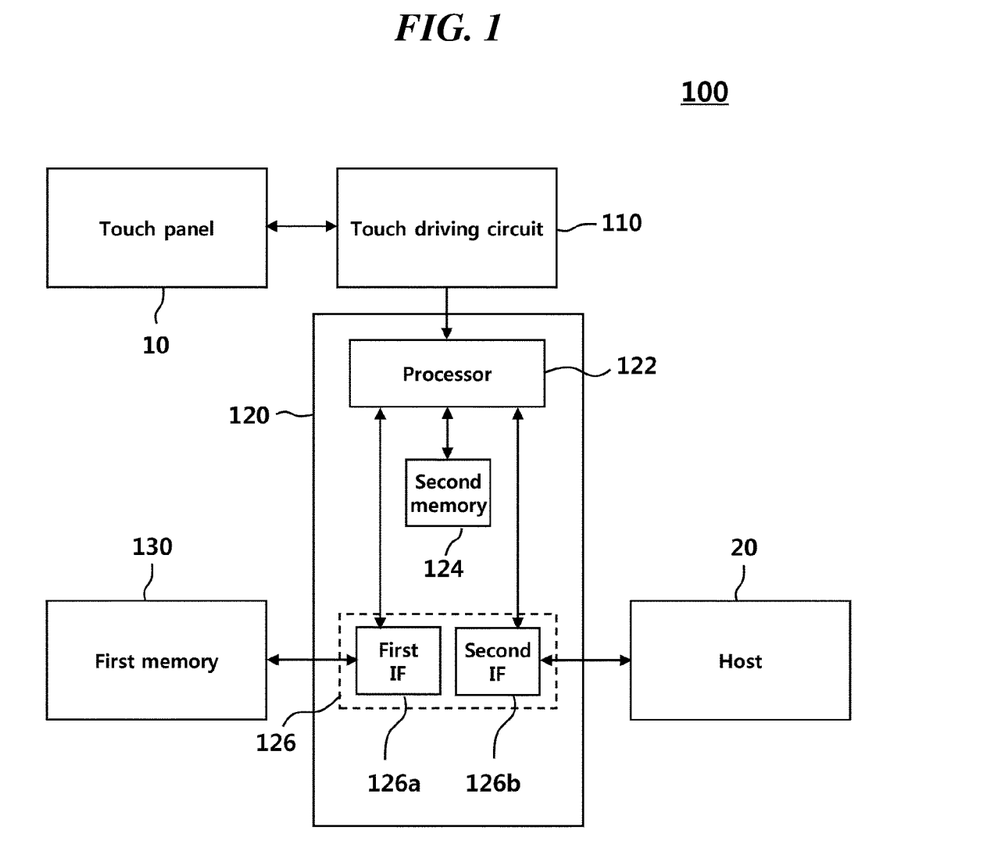
FIG. 1 is a diagram illustrating the configuration of a touch system according to an embodiment.

FIG. 1 is a diagram illustrating the configuration of a touch system according to an embodiment.

Referring to FIG. 1, a touch system 100 according to an embodiment may include a touch driving circuit 110, a touch microcontroller unit (MCU) 120, and a first memory 130, which interwork with a touch panel 10 of an electronic device and a host 20. Here, the host 20 may be the main controller of an electronic device. For example, if the electronic device is a mobile communication terminal, the host 20 may be an application processor of the mobile communication terminal, and if the electronic device is a monitor or a television (TV), the host 20 may be a multi-core processor of the monitor or the TV.

Meanwhile, the touch panel 10 may be bonded on an upper polarizing plate of a display panel (not shown), or may be formed between an upper polarizing plate and an upper substrate. In addition, in the case where the touch panel 10 is formed by an in-cell type, the touch panel 10 may be formed on a lower substrate together with a pixel array in the display panel (not shown).

The touch panel 10 may include sensor electrodes including driving electrodes and reception electrodes.

The touch driving circuit 110 supplies driving signals to sensor electrodes of the touch panel 10.

In addition, the touch driving circuit 110 may receive response signals from the sensor electrodes, and may output touch data according to the response signals.

When an object such as a user's body or a touch pen approaches or touches a portion of the touch panel 10, the difference in magnitude between the response signal corresponding to the portion of the touch panel 10 and the response signals of other portions thereof may increase. Thus, the touch driving circuit 110 may generate touch data on the object approaching or touching the portion of the touch panel 10 according thereto.

The touch MCU 120, that is, a touch device, may calculate touch coordinates on the touch panel 10 using the touch data generated in the touch driving circuit 110.

In addition, the touch MCU 120 may transmit the touch coordinates to the host 20.

The touch MCU 120 may include a processor 122, a second memory 124, and a communication interface 126. Here, the communication interface 126 may include a first communication interface 126a providing a communication path between the processor 122 and the first memory 130, and a second communication interface 126b providing a communication path between the processor 122 and the host 20. In addition, the second memory 124 may be volatile memory such as RAM (random access memory).

The processor 122 may receive touch data from the touch driver 110 through a third communication interface (not shown), may upload first firmware stored in the first memory 130, which will be described below, to the second memory 124, and may execute the same.

According to this, the touch MCU 120 may calculate touch coordinates on the touch panel 10 on the basis of the touch data, and may transmit the touch coordinates to the host 20 such that the electronic device may generate an event through the touch coordinates.

In other words, the first firmware may include a first algorithm for calculating touch coordinates on the touch panel 10 on the basis of the touch data.

Meanwhile, the first firmware may further include a second algorithm for managing updating of the first firmware.

Specifically, the first firmware executed by the processor 122 may receive update-data for the first firmware from the host 20. Here, the first firmware may temporarily store the update-data in the second memory 124.

Figure 2:
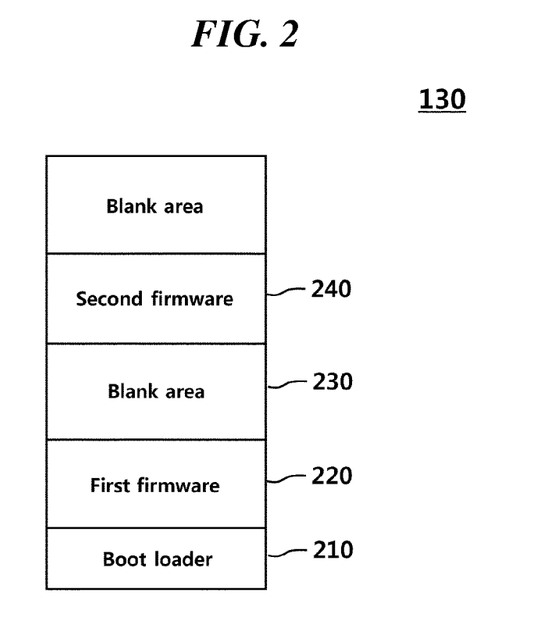
FIG. 2 is a diagram illustrating an example of a data storage area of a first memory according to an embodiment.

In addition, the first firmware may store header data of the update-data after storing body data of the update-data in a first firmware storage area 220 of the first memory 130 as shown in FIG. 2. Here, the first firmware may store the header data in a blank section provided at the front of the memory section in which the body data is stored. A detailed description thereof will be given with reference to FIGS. 3 to 5.

Conventionally, only the validity of header data of update-data is verified after storing the header data in the first memory 130, and if the validity of the header data is proved, body data is stored in the first memory 130 without verifying the validity thereof. Therefore, if errors occur in the body data when updating firmware, updating of the firmware is not normally completed.

In order to solve the problem, in an embodiment, header data is stored after body data is stored in the first memory 130. Here, the first memory 130 may be nonvolatile memory such as flash memory.

In an embodiment, the first firmware, which is uploaded to the second memory 124 and is running, may verify the validity of body data after storing the body data in a first firmware storage area 220 of the first memory 130, and, if the validity of the body data is proved (e.g., confirmed), may store header data in the first firmware storage area 220. Here, the first firmware may delete existing first firmware stored in the first firmware storage area 220 before storing the body data in the first firmware storage area 220.

When storing the body data in the first memory 130, the first firmware may divide the body data into a plurality of data blocks, and may sequentially store the same in the first firmware storage area 220 of the first memory 130, wherein the first firmware may verify the validity of one data block whenever one data block is stored in the first memory 130.

If the validity is proved for all of the plurality of data blocks through the method described above, the first firmware may store header data in the first firmware storage area 220 of the first memory 130.

Thereafter, the first firmware may verify the validity of the header data, and, if the validity of the header data is proved, may complete the updating of the first firmware. Here, since the first firmware is uploaded to the second memory 124 by the processor 122 and is running, existing first firmware stored in the first memory 130 may be updated.

In an embodiment, the first firmware may verify the validity of body data or the validity of header data using one or more of parity checking, cyclically redundancy checking (CRC), and checksum.

Figure 3:
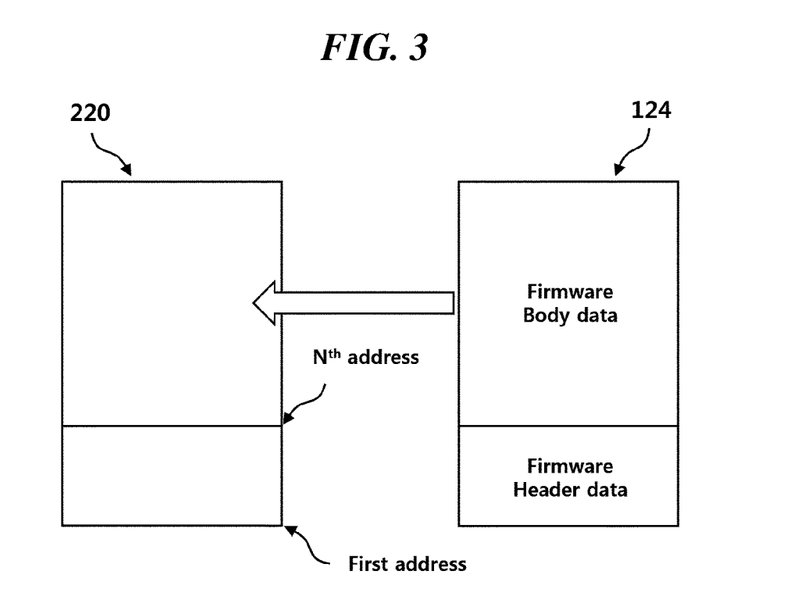
FIGS. 3 to 5 are diagrams illustrating a process of updating firmware according to an embodiment.

In an embodiment, when storing update-data in the first firmware storage area 220 of the first memory 130 as shown in FIG. 2, the firmware may configure a first address to an $N^{th}$ address, which belong to the range of addresses for the memory section for storing header data in the first firmware storage area 220 of the first memory 130, as a blank section, and may then store the body data temporally stored in the second memory 124 in an $(N+1)^{th}$ address of the first firmware storage area 220 and in addresses subsequent thereto, as shown in FIG. 3.

Figure 4:
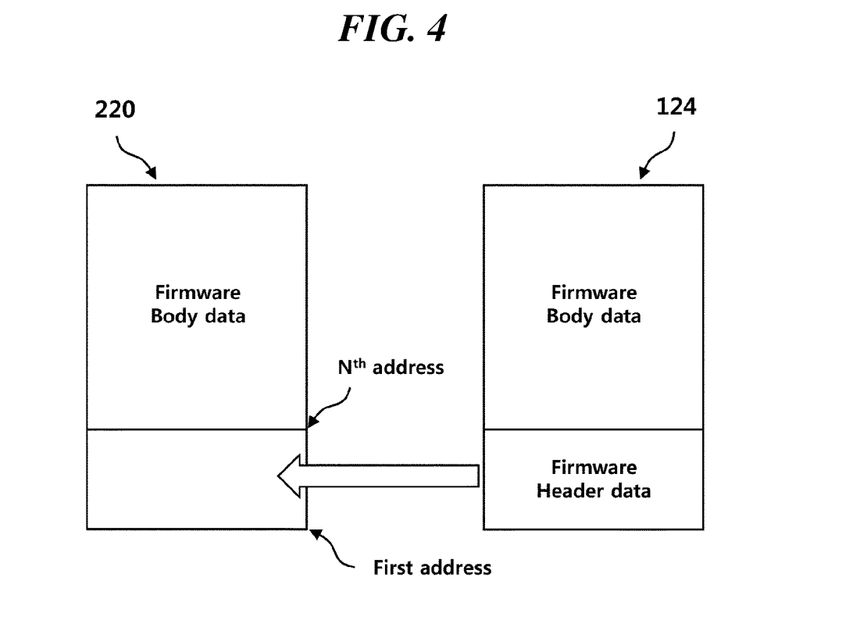

In addition, if the validity of the body data is proved, the first firmware may store the header data, which is temporarily stored in the second memory 124, in the blank section of the first firmware storage area 220 as shown in FIG. 4.

Figure 5:
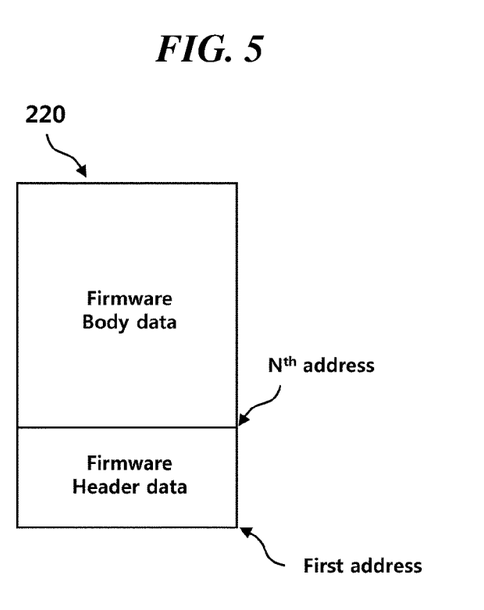

Thereafter, if the validity of the header data is proved through the verification of the validity thereof, the first firmware may complete the updating of the first firmware as shown in FIG. 5.

As described above, in an embodiment, it is possible to normally complete the updating of firmware by storing header data of update-data and verifying the validity thereof after storing body data thereof and verifying validity thereof in order to eliminate errors that may occur when updating firmware.

Meanwhile, in an embodiment, a second firmware, which is different from the first firmware, may be further stored in the first memory 130, and when errors occur in the first firmware due to frequent execution of the first firmware or the like, the processor 122 may execute the second firmware so as to update the first firmware having errors into normal first firmware.

Specifically, in an embodiment, the first memory 130 may store the first firmware in the first firmware storage area 220, and may store the second firmware in the second firmware storage area 240 as shown in FIG. 2.

Here, a boot loader stored in a boot loader storage area 210 causes the processor 122 to upload the first firmware stored in the first firmware area 122 to the second memory 124 and to execute the same when power is supplied to the electronic device including the touch system 100.

In addition, when errors occur in the first firmware, the boot loader causes the processor 122 to upload the second firmware stored in the second firmware storage area 240 to the second memory 124 and to execute the same.

The first firmware stored in the first firmware storage area 220 may be the firmware for driving of the processor 122 in normal times. In other words, the first firmware may include a first algorithm for calculating touch coordinates on the touch panel 10 on the basis of touch data, and may further include a second algorithm for managing the updating of the first firmware.

Here, the first firmware storage area 220 may be a memory area in which read and write operations are possible.

The second firmware stored in the second firmware storage area 240 may be uploaded to the second memory 124 by the processor 122 when errors occur in the first firmware, and may be executed by the processor 122, thereby receiving update-data for the first firmware from the host 20. The second firmware storage area 240 may be a read-only memory area.

The second firmware may store header data of update-data in the first firmware storage area 220 of the first memory 130 after storing body data of the update-data in the first firmware storage area 220 such that the header data is stored in a blank section provided at the front of the memory section in which the body data is stored.

In other words, the second firmware may include a third algorithm for managing updating of the first firmware. In addition, the second firmware may further include a first algorithm for calculating touch coordinates on the touch panel 10 on the basis of touch data.

Here, the second firmware, like the first firmware, may verify the validity of body data after storing the body data in the first firmware storage area 220 of the first memory 130, and, if the validity of the body data is proved, may store header data in the first firmware storage area 220. Here, the second firmware may delete existing first firmware stored in the first firmware storage area 220 before storing the body data in the first firmware storage area 220.

When storing the body data in the first firmware storage area 220, the second firmware may divide the body data into a plurality of data blocks, and may sequentially store the same in the first firmware storage area 220 of the first memory 130 while verifying the validity of one data block whenever one data block is stored in the first memory 130.

If the validity is proved for all of the plurality of data blocks through the method described above, the second firmware may store header data in the first firmware storage area 220 of the first memory 130.

Thereafter, the second firmware may verify the validity of the header data, and, if the validity of the header data is proved, may complete the updating of the first firmware.

In an embodiment, when the second firmware stores update-data in the first firmware storage area 220 of the first memory 130 as shown in FIG. 2, the second firmware may configure a first address to an $N^{th}$ address, which belong to the range of addresses for the memory section for storing header data in the first firmware storage area 220 of the first memory 130, as a blank section, and may then store the body data in an $(N+1)^{th}$ address of the first firmware storage area 220 and in addresses subsequent thereto, as shown in FIG. 3.

In addition, if the validity of the body data is proved, the second firmware may store the header data in the blank section of the first firmware storage area 220 as shown in FIG. 4.

As described above, in an embodiment, first firmware for driving of the processor 122 in normal times and second firmware for driving of the processor 122 in the case where errors occur in the first firmware are stored in the first memory 130, respectively, and even if errors occur in the first firmware, the first firmware may be updated through the second firmware.

If the size of data on the first firmware becomes more than the existing size thereof when updating the first firmware, the update-data of the first firmware may be stored to exceed the first firmware storage area 220. Therefore, a blank area 230 corresponding to a specific memory section may be provided between the first firmware storage area 220 and the second firmware storage area 240 in the first memory 130.

In other words, when allocating the memory sections of the first memory 130, the blank area 230 may be allocated between the first firmware storage area 220 and the second firmware storage area 240.

Hereinafter, a process of updating firmware in the touch system 100 will be described.

Figure 6:
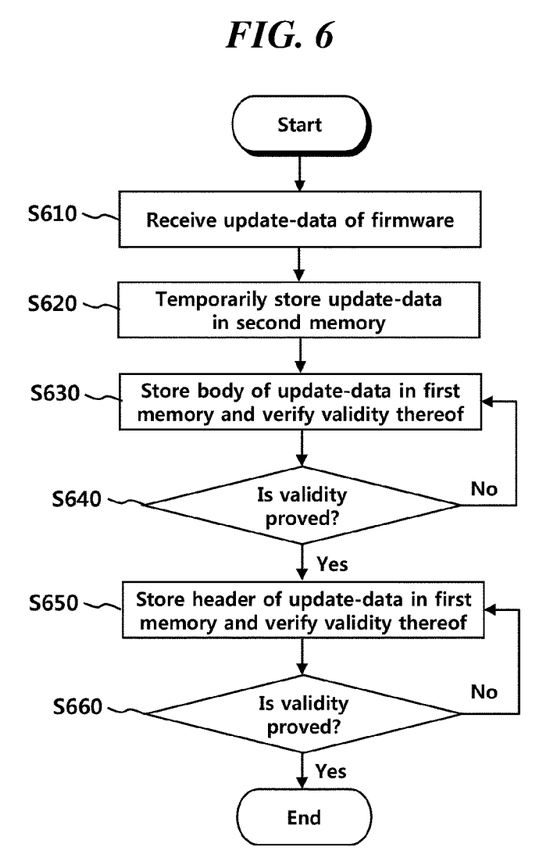
FIG. 6 is a flowchart illustrating a process of updating firmware in a touch system according to an embodiment.

FIG. 6 is a flowchart illustrating a process of updating firmware in a touch system according to an embodiment.

Referring to FIG. 6, a first firmware, which is uploaded from the first memory 130 to the second memory 124 by the processor 122 of the touch MCU 120 and is executed, may receive update-data of the first firmware from the host 20 (S610). Here, the host 20 may receive update-data of the first firmware from an external server through a wired/wireless communication module provided in an electronic device, or may receive update-data of the first firmware from an external memory (e.g., USB memory, etc.) connected to the electronic device, thereby transmitting the update-data to the touch system 100.

The first firmware may temporarily store the update-data in the second memory 124 such as random access memory (RAM) (S620).

In addition, the first firmware may store body data of the update-data in the first firmware storage area 220 of the first memory 130, and may verify the validity of the body data (S630). Here, the first firmware may divide the body data temporarily stored in the second memory 124 into a plurality of data blocks, and may sequentially store the plurality of data blocks in the first firmware storage area 220 of the first memory 130. In addition, the first firmware may verify the validity of one data block whenever one data block is stored in the first memory 130. Accordingly, the validity may be verified and proved for of all of the plurality of data blocks.

Before step S630, the first firmware may delete existing first firmware stored in the first firmware storage area 220.

Before step S630, the first firmware may configure a first address to an $N^{th}$ address, which belong to the range of addresses for the memory section for storing header data in the first firmware storage area 220 of the first memory 130, as a blank section as shown in FIG. 3, and may then store the body data temporally stored in the second memory 124 in an $(N+1)^{th}$ address of the first firmware storage area 220 and in addresses subsequent thereto.

Meanwhile, if the validity of the body data is proved, the first firmware may store header data in the first firmware storage area 220, and may verify the validity of header data (S640 and S650). If the validity of the body data is not proved in step S640, the first firmware may delete the body data stored in the first firmware storage area 220, and may then store again the body data, which is temporally stored in the second memory 124, in the first firmware storage area 220, thereby reverifying the validity of the body data.

If the validity of the header data is proved, the first firmware may complete the updating of the first firmware (S660). If the validity of the header data is not proved in step S650, the first firmware may delete the header data stored in the first firmware storage area 220, and may then store the header data, which is temporally stored in the second memory 124, in the first firmware storage area 220 again, thereby reverifying the validity thereof.

In an embodiment, the first firmware may verify the validity of body data or the validity of header data using one or more of parity checking, cyclically redundancy checking (CRC), and checksum.

What is claimed is:

1. A touch system comprising:
    a processor;
    a first memory configured to store a first firmware for driving the processor in a first area and a second firmware for driving the processor in a second area different from the first area; and
    a second memory configured to store the first firmware which is uploaded by the processor, wherein
    the first firmware is configured to:
        receive update-data for the first firmware from a host after being executed by the processor in a state of being uploaded to the second memory;
        after receiving the update-data for the first firmware from the host, store body data of the update-data in the first memory;
        after storing the body data of the update-data in the first memory, verify a validity of the body data of the update-data stored in the first memory;
        based at least on a result of verifying the validity of the body data of the update-data stored in the first memory, store header data of the update-data in a blank section provided at a front of a memory section in which the body data of the update-data is stored in the first memory; and
        after storing the header data in the first memory after verifying the validity of the body data, verify the validity of the header data, and if the validity of the header data is proved, complete updating of the first firmware,
    the first area corresponds to a memory area in which read and write operations are possible in the first memory, and the second area corresponds to a read-only memory area in the first memory,
    the second firmware is configured to be uploaded to the second memory and to be executed by the processor to receive the update-data for the first firmware from the host when an error occurs in the first firmware,
    the first memory further includes a blank area corresponding to a predetermined memory section,
    the blank area is provided between the first area of the first firmware and the second area of the second firmware,
    the first area, the second area, and the blank area are provided in a same physical medium, and
    the header data of the update-data is stored in the first memory only if the validity of the body data of the update-data stored in the first area of the first memory is verified.

2. The touch system of claim 1, further comprising a touch driving circuit configured to supply a driving signal to a sensor electrode of a touch panel provided in an electronic device, and to receive a response signal to the driving signal from the sensor electrode, thereby generating touch data, wherein
    the first firmware executed by the processor is configured to calculate touch coordinates on the touch panel based on the touch data and provide the touch coordinates to the host.

3. The touch system of claim 1, wherein the first firmware is configured to divide the body data into a plurality of data blocks and to sequentially store the plurality of data blocks in the first memory, and the first firmware is configured to verify a validity of one data block from the plurality of data blocks whenever the one data block is stored in the first memory and, if the validity is proved for all of the plurality of data blocks, to store the header data in the first memory.

4. The touch system of claim 1, further comprising a communication interface that comprises a first communication interface configured to provide a communication path between the processor and the first memory, and a second communication interface configured to provide a communication path between the processor and the host.

5. The touch system of claim 1, wherein
the first firmware is configured:
   to temporarily store the update-data in the second memory;
   to set, as a blank section, a section of the first memory associated with a first address to an $N^{th}$ address belonging to a range of addresses for a memory section of the first memory; and
   to store the body data in an $(N+1)^{th}$ address of the first memory and in addresses subsequent thereto,
N is a natural number, and
the header data is stored in the memory section of the first memory.

6. A method for updating a firmware in a touch system provided in an electronic device, the method comprising:
   receiving update-data for the firmware from a host of the electronic device;
   temporarily storing the update-data in a second memory of the electronic device;
   storing body data of the update-data in a first area of a first memory of the electronic device;
   after storing the body data of the update-data in the first area of the first memory,
   verifying a validity of the body data of the update-data stored in the first area of the first memory;
   based at least on a result of verifying the validity of the body data of the update-data stored in the first area of the first memory, storing header data of the update-data in the first memory; and
   after storing the header data in the first memory after verifying the validity of the body data, verifying the validity of the header data, and if the validity of the header data is proved, completing updating of the first firmware, wherein
   the first memory is configured to store a first firmware for driving a processor in the first area and a second firmware for driving the processor in a second area different from the first area,
   the first area corresponds to a memory area in which read and write operations are possible in the first memory, and the second area corresponds to a read-only memory area in the first memory,
   the second firmware is configured to be uploaded to the second memory and to be executed by the processor to receive the update-data for the first firmware from the host when an error occurs in the first firmware,
   the first memory further includes a blank area corresponding to a predetermined memory section,
   the blank area is provided between the first area of the first firmware and the second area of the second firmware,
   the first area, the second area, and the blank area are provided in a same physical medium, and
   the header data of the update-data is stored in the first memory only if the validity of the body data of the update-data stored in the first area of the first memory is verified.

7. The method of claim 6, wherein, in the header data storage step, the touch system is configured to store the header data in a blank section provided at a front of the section in which the body data is stored in the first memory.

8. The method of claim 6, wherein the body data storage step comprises steps of:
   dividing the body data temporarily stored in the second memory into a plurality of data blocks;
   sequentially storing the plurality of data blocks in the first memory while verifying validity of one data block from the plurality of data blocks whenever the one data block is stored in the first memory; and
   verifying the validity for all of the plurality of data blocks.

9. The method of claim 6, wherein the touch system comprises:
   a touch driving circuit configured to supply a driving signal to a sensor electrode of a touch panel provided in the electronic device, and to receive a response signal to the driving signal from the sensor electrode, thereby generating touch data; and
   a touch device configured to receive the touch data from the touch driving circuit through an execution of the firmware, and to calculate touch coordinates on the touch panel based on the touch data.

10. The method of claim 6, wherein, in the body data storage step, the validity of body data is verified using one or more of a parity check, a cyclic redundancy check (CRC), and a checksum.

* * * * *